United States Patent
Hsieh

(10) Patent No.: US 10,676,991 B2
(45) Date of Patent: Jun. 9, 2020

(54) DOOR CURTAIN ANTI-DROPPING DEVICE HAVING LATCHING PIN LOCKING MECHANISM

(71) Applicant: Chung Hsien Hsieh, New Taipei (TW)

(72) Inventor: Chung Hsien Hsieh, New Taipei (TW)

( * ) Notice: Subject to any disclaimer, the term of this patent is extended or adjusted under 35 U.S.C. 154(b) by 291 days.

(21) Appl. No.: 15/952,432

(22) Filed: Apr. 13, 2018

(65) Prior Publication Data

US 2019/0112875 A1    Apr. 18, 2019

(30) Foreign Application Priority Data

Oct. 16, 2017    (TW) ............................. 106135324 A

(51) Int. Cl.
*F16H 57/10*    (2006.01)
*E06B 9/84*    (2006.01)
(Continued)

(52) U.S. Cl.
CPC .................. *E06B 9/84* (2013.01); *E06B 9/68* (2013.01); *F16H 57/021* (2013.01);
(Continued)

(58) Field of Classification Search
CPC ........ E06B 2009/807; E06B 9/80; E06B 9/84; E06B 2009/801; E06B 2009/802; F16H 2035/006; F16H 1/16
See application file for complete search history.

(56) References Cited

U.S. PATENT DOCUMENTS 4,125,142 A * 11/1978 Fohl .......................... E06B 9/84
160/291
5,190,503 A * 3/1993 Russ ....................... B64C 13/34
475/269
(Continued)

FOREIGN PATENT DOCUMENTS

CN    200952344 Y    9/2007
CN    201486453 U    5/2010
(Continued)

OTHER PUBLICATIONS

TW Office Action dated Jun. 19, 2018 in corresponding Taiwan application (No. 106135324).
(Continued)

*Primary Examiner* — Jake Cook
(74) *Attorney, Agent, or Firm* — McClure, Qualey & Rodack, LLP

(57) ABSTRACT

A door curtain anti-dropping device for a rolling door is provided. The device comprises a worm shaft connected to the output shaft of the door operator, and a drive shaft comprising a limiting disc with through holes. The worm wheel having receiving slots is fixed on the drive shaft to mesh with the worm. The driven wheel is disposed adjacent to the limiting disc. Baffle plates designed to cover the through holes and receiving slots extend from the driven wheel. Plural latching pins stored with spring potential energy are compressed by the baffle plates and retained in the through holes and receiving slots. When the worm wheel is excessively worn and dislocated from the driven wheel, the baffle plates are moved to allow the latching pins to spring out and insert into the notches of the front cover, thereby lock the worm wheel and prevent the winding shaft from rotating.

8 Claims, 3 Drawing Sheets

(51) Int. Cl.
*E06B 9/68* (2006.01)
*F16H 57/021* (2012.01)
*F16H 57/031* (2012.01)
*F16H 63/38* (2006.01)
*F16H 63/34* (2006.01)
*F16H 57/039* (2012.01)
*F16H 1/16* (2006.01)
*E06B 9/80* (2006.01)
*F16H 57/02* (2012.01)
*F16H 35/00* (2006.01)

(52) U.S. Cl.
CPC ......... *F16H 57/031* (2013.01); *F16H 57/039* (2013.01); *F16H 63/34* (2013.01); *F16H 63/38* (2013.01); *E06B 2009/801* (2013.01); *E06B 2009/802* (2013.01); *F16H 1/16* (2013.01); *F16H 2035/005* (2013.01); *F16H 2057/0213* (2013.01); *F16H 2057/02039* (2013.01)

(56) References Cited

U.S. PATENT DOCUMENTS 6,059,008 A * 5/2000 Yoshida ................ E05F 5/00
160/296

| 7,686,150 | B2 | 3/2010 | Hsieh |
| 8,657,096 | B2 | 2/2014 | Hsieh |
| 9,376,864 | B2 | 6/2016 | Hsieh |
| 2017/0089134 | A1 | 3/2017 | Hsieh |

FOREIGN PATENT DOCUMENTS

| CN | 202441245 U | 9/2012 |
| DE | 3427505 A | 2/1986 |
| DE | 3427505 A1 | 2/1986 |
| DE | 29502273 U1 | 9/1996 |
| EP | 0787885 A2 | 8/1997 |
| TW | 201314010 A1 | 4/2013 |
| TW | I487832 | 6/2015 |
| TW | I542778 B | 7/2016 |

OTHER PUBLICATIONS

Search Report issued in TW Office Action dated Jun. 19, 2018 in corresponding Taiwan application (No. 106135324).
Singapore Written Opinion dated Apr. 22, 2019 in Application No. 10201802978R.
Search Report issued in Singapore Written Opinion dated Apr. 22, 2019 in Application No. 10201802978R.

* cited by examiner

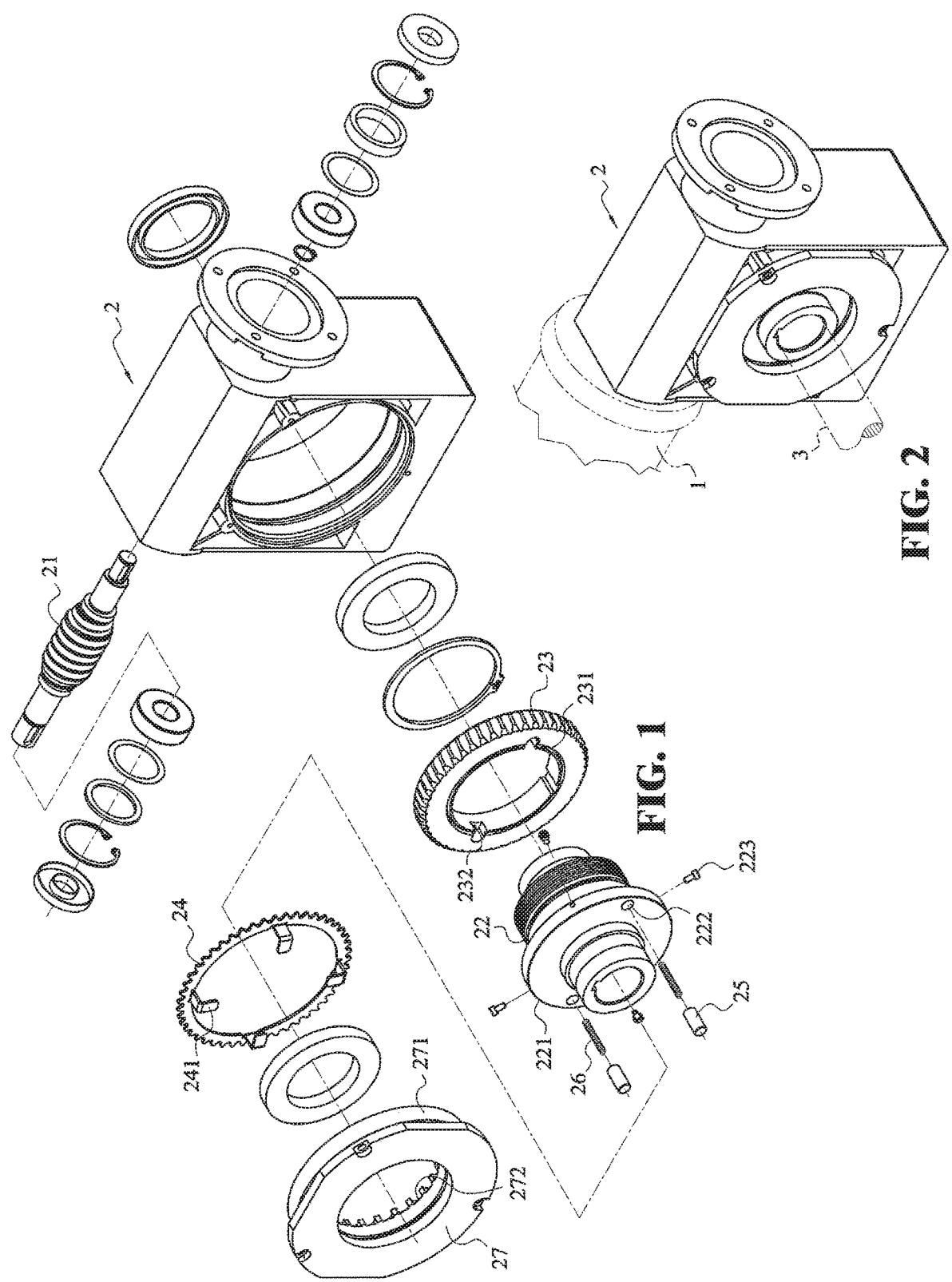

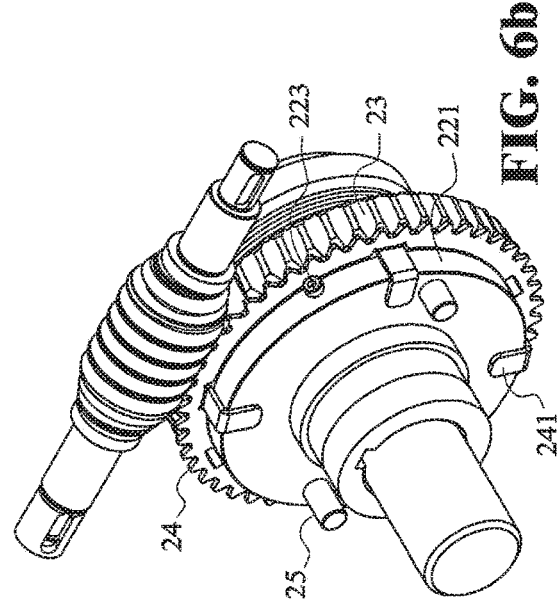
FIG. 6a
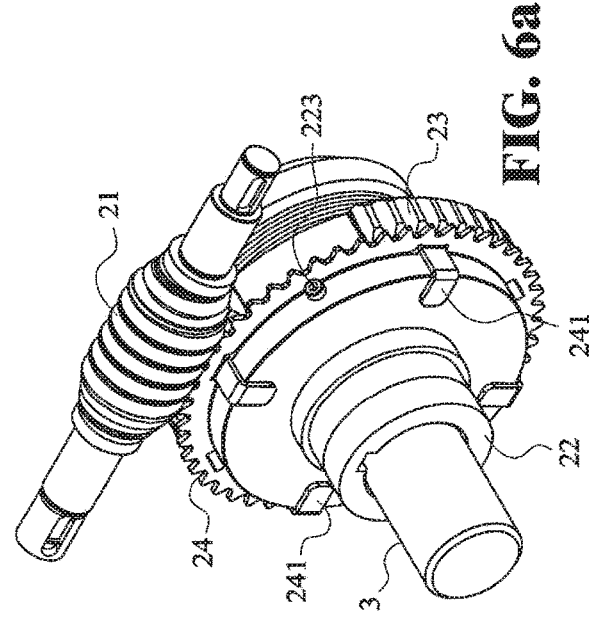
FIG. 6b
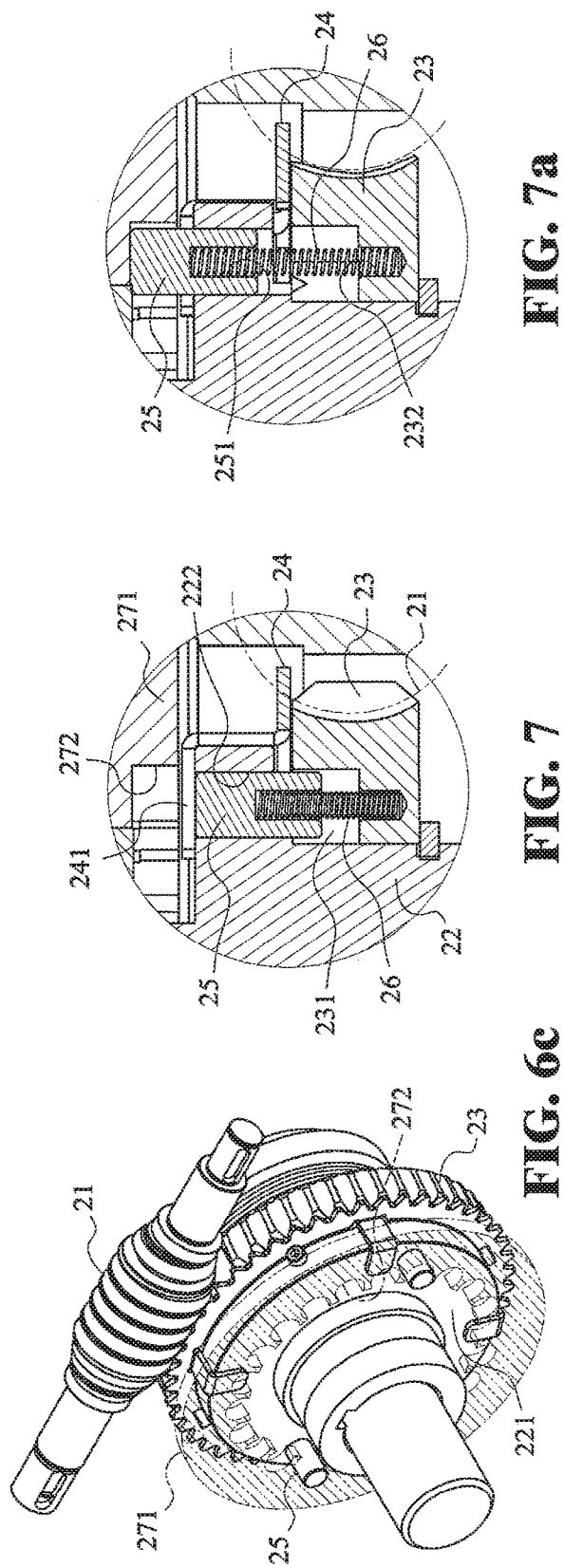
FIG. 6c
FIG. 7
FIG. 7a

DOOR CURTAIN ANTI-DROPPING DEVICE HAVING LATCHING PIN LOCKING MECHANISM

BACKGROUND OF THE INVENTION

Field of the Invention

The present invention relates to a door curtain anti-dropping device for a rolling door, in particular an anti-dropping device which makes use of the shaft adaptation system between a door operator and a winding shaft, and is effected to lock the winding shaft by means of the latching pins in the event that the gear teeth of the worm wheel are overworn or broken.

Description of the Related Art

In the rolling door system, a chain and sprocket are generally used as the reel mechanism between the door operator and the winding shaft. The failure rate of such mechanism is comparatively lower than that of the control mechanism or other mechanisms. As such, this mechanism is deemed as a safer mechanism, and the potential dangers underlying this mechanism are normally neglected.

The potential risk of such reel transmission formed of chain and sprocket lies in that the dropping of the door curtain as a result of power failure or chain breakage can be devastating. It is known that the improvement of the control mechanism can easily overcome the problem of free falling due to power failure can be solved by control mechanism. However, chain breakage is difficult to predict or prevent. For a small-sized door curtain, as the frequency of use is comparatively less, it is possible that chain breakage may not ever happen.

However, as to a door curtain for a huge rolling door, in particular the door curtain of the rolling door for a large-sized warehouse may weigh several tons. As the same stroke is repeated for raising and lowering the door curtain, the reel mechanism experiences repeated wear at the same spots. The wear level of the mechanism increases with the working time and the frequency of use, and the average users may be difficult to notice the extent of wear. In case the chain breaks, the fall of the door curtain under gravitation force may cause great destruction and harm.

Moreover, for the purpose of energy saving or preventing the leak of warm air, the opening and closing of the warehouse door is quite frequent. As the operating speed of the electric rolling door increases tremendously, the service life of the rolling door is shortened. Should the wears of the chain and gear reach a certain extent without effective detection, the safety of the rolling door is in question.

There are a number of literatures that provides solutions to prevent accidental dropping of the door curtain of an elevated door system. For example, DE 29 50 2273 discloses a drive member comprising a catch element held by a bolt connected to a drive worm gear. The catch element is rotatably connected to the drive worm gear and auxiliary worm gear by means of the guide bolt connected to the auxiliary worm gear. The edge of the catch element rotates the adjust element in the slot. The plastic ring in the slot is rotated by the catch element at the edge, and activates the switch when deformed, so as to disconnect the control voltage of the driving motor.

In addition, U.S. Pat. No. 7,686,150 issues to the present inventor provides a speed limit device for door comprising: an input shaft having one end coupled to the door operator, and having a first gear and a second gear. The first gear drives a hollow shaft to rotate the winding shaft of the door curtain. The second gear drives a third shaft simultaneously, and a third shaft having an active gear provided thereon. A brake device includes a clutch mechanism disposed on the hollow shaft. The clutch mechanism restrains the synchronous operation between a passive gear and the active gear. When the rotation speed of the winding shaft is abnormal, the clutch mechanism offsets to lock the winding shaft, to thereby prevent the door curtain from dropping.

In addition, U.S. Pat. No. 9,376,864 issues to the present inventor provides a door curtain anti-dropping device, which includes at least one rotating shaft, a reducer mechanism, a brake mechanism, and a rotational speed detecting module. The rotating shaft is coupled to the winding shaft for operation, so that the rotational speed of the winding shaft is reduced secondarily by the reducer mechanism to make the brake mechanism lock the winding shaft by using a small braking force. When the door operator drives the drive shaft to rotate, the rotational speed of the winding shaft is detected by the rotational speed detecting module. Once an abnormal rotational speed of the winding shaft is detected, the brake mechanism locks the winding shaft, to thereby avoid the dropping of the door curtain.

SUMMARY OF THE INVENTION

The primary object of the present invention is to provide a door curtain anti-dropping device for a rolling door having latching pin locking mechanism, which makes use of the shaft adaptation system between the door operator and the winding shaft. When the gear teeth of the worm wheel are broken or excessively worn, the winding shaft is locked by the latching pins so as to ensure the safety of the rolling door system.

A further object of the present invention is to provide a door curtain anti-dropping device for a rolling door that simplifies and miniaturizes the shaft transmission system between the door operator and the winding shaft, so as to reduce the manufacturing cost.

In order to achieve the above and other objects, the present invention provides an anti-dropping device having a latching mechanism which mainly includes a gear box having a force input end and a force output end, the force input end is connected to an output end of a door operator, and the force output end is loaded with the door curtain.

The anti-dropping device further comprises a worm, a drive shaft, a worm wheel, a driven wheel, at least a latching pin, and a front cover. The worm is disposed in a first direction of the gear box, with one end pivotally mounted on the gear box, and the other end coupled to the output shaft at the output end of the door operator.

The drive shaft is disposed along the second direction of the gear box, and the second direction is perpendicular to the first direction. One end of the drive shaft is pivoted on the gear box and the other end drives the winding shaft of the door curtain. A limiting disc is provided on the drive shaft and has at least one through hole on the radial end face.

The worm gear is mounted on the drive shaft and meshes with the worm. At least a receiving slot that corresponds with the at least one through hole is provided on the end face of the worm wheel that faces the limiting disc.

The driven wheel is rotatably provided on the drive shaft, and is arranged adjacent to the limiting disc so as to locate between the worm wheel and the limiting disc. The driven wheel is, however, designed not to move axially. The driven wheel has teeth that correspond to the gear teeth of the worm wheel, the worm wheel and the driven wheel being in mesh with the worm so as to be driven by the worm synchronously. At least a baffle plate extends outwards from the driven wheel towards the other end face of the limiting disc, and is configured to cover the through hole.

The at least one latching pin has one end stored with spring potential energy and is received in the at least one receiving slot, and the other end of the latching pin is compressed and retained in the at least one through hole by the at least one baffle plate.

The front cover is fixed to the gear box. The front cover comprises an end plate having a predetermined diameter and arranged opposite the limiting disc. The end plate includes a plurality of notches along the inner circumference thereof and correspond to the at least one through hole.

Preferably, a pair of through holes is provided diametrically opposite each other on the limiting disc. The number of through holes includes but not limited to one pair, and it may be one, a pair or two pairs.

Preferably, a pair of receiving slots corresponding to the pair of through holes is disposed diametrically opposite each other on the inner circumference of the worm wheel, and each receiving slot includes a restricting slot.

Preferably, a pair of latching pins is accommodated in the corresponding receiving slots, and a notch is formed on an end face of each of the latching pins.

Preferably, the present invention further comprises a pair of elastic elements that store the spring potential energy by compression. One end of the elastic element is correspondingly received in the restricting slot of each receiving slot, and the other end of each elastic element is correspondingly inserted in the notch of the latching pin.

Preferably, four equally spaced baffle plates are disposed in pairs that diametrically opposite one another on the driven wheel. Each baffle plate is in the shape of letter "L", so as to be able to clamp firmly on the limiting disc. Furthermore, a pair out of the two pairs of the baffle plates is configured to have their free ends covering respective through holes of the limiting disc.

Preferably, a plurality of notches are equally spaced on the inner circumference of the end plate. The notches are dimensioned to match the through holes of the limiting disc.

According to the invention, the driven wheel is harder than the worm wheel; in other words, the abrasion performance of the driven wheel is set to be higher than the worm wheel. As a result, the worm wheel and the driven wheel are subject to different degree of wear by the action of the worm. Accordingly, when the gear teeth of the worm wheel are excessively worn, and results in misalignment with the teeth of the driven wheel, the baffle plates are moved to allow the latching pins to spring out and insert into the respective grooves of the front cover, thereby locking the worm wheel, and restricting the winding shaft of the door curtain from rotating.

As the worm has a smaller diameter and fewer gear teeth than the worm wheel, the reduction ratio between the worm and the worm wheel is high. Such worm and worm wheel transmission may replace the conventional multi-stage gear reduction transmission, and provides the following advantages: fewer components, compact in structure, simple construction, miniaturize, low cost, stable in operation, low noise and low vibration.

The above and other objects, features and advantages of the present invention will become apparent with regard to the following descriptions, appended claims and accompanying drawings, in which:

BRIEF DESCRIPTION OF THE DRAWINGS

FIG. 1 is a perspective exploded view showing a preferred embodiment of a door curtain anti-dropping device according to the present invention;

FIG. 2 is a perspective view showing the door curtain anti-dropping device in assembled state;

FIG. 6a is similar to FIG. 6 but illustrates the condition where the worm wheel suffers teeth rupture;

FIG. 6b is similar to FIG. 6 but illustrates the condition where the latching pins spring out when the worm wheel is offset from the driven wheel;

FIG. 6c is similar to FIG. 6 but illustrates the condition where the latching pins spring out and insert in the notches of the front cover to lock the worm wheel;

FIG. 7 is a partial enlarged view showing that the latching pins are held in the retained position under a normal condition where the worm wheel is in synchronization with the driven when in motion; and FIG. 7a is a partial enlarged view showing that the latching pins spring out beyond the groove of the front cover when the worm wheel is offset from the driven wheel.

DESCRIPTION OF THE PREFERRED EMBODIMENTS

Figure 4:
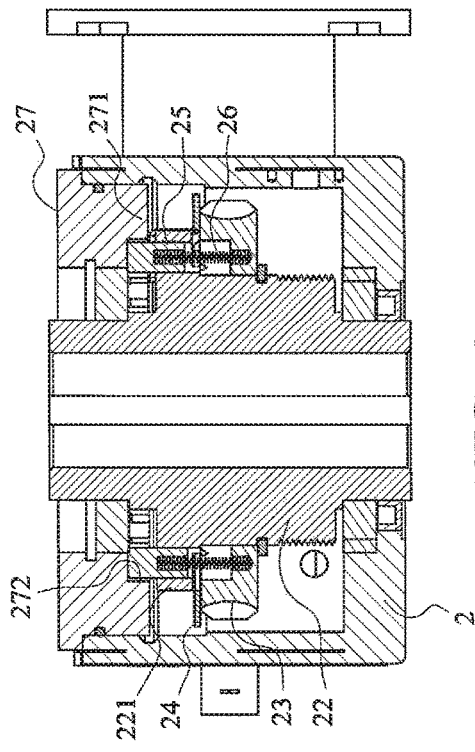
FIG. 4 is a sectional view taken along line 4-4 of FIG. 3.

FIGS. 1 and 2 illustrate a preferred embodiment of a door curtain anti-dropping device according to the present invention. As shown in the figures, the door curtain anti-dropping device according to this embodiment mainly comprises a gear box 2 having an input end connected to an output end of a door operator 1, and an output end connected to a winding shaft 3 of the door curtain. As the present invention does not involve improvement in the basic structure of the rolling door system, details of the rolling door system are omitted.

With reference to FIGS. 1-6, the door curtain anti-dropping device according to the present invention further includes a worm 21, a drive shaft 22, a worm gear 23, a driven wheel 24, at least one latching pin 25, and a front cover 27. The worm 21 is arranged in the first direction of the gear box 2, and is axially provided thereon with helical tooth grooves. The worm 21 has one end pivotally mounted ion the gear box 2, and the other end coupled to an output shaft (not shown) of the door operator 1.

The drive shaft 22 is arranged in the second direction of the gear box 2, which is perpendicular to the first direction. As such, the axis of the drive shaft 22 and the axis of the worm 21 are perpendicular to each other. The drive shaft 22 has a first end and a second end, the first end pivotally mounted to the gear box 2, and the other end, the second end for driving the winding shaft 3 of the door curtain. A limiting disc 221 is disposed at the second end of the drive shaft 22. At least one through hole 222 is formed on a radial end face of the limiting disc 221. Preferably, a pair of through holes 222 is provided diametrically opposite each. Of course, the present invention includes but is not limited to a pair of through holes. One, two or more through holes 222 may be provided.

The worm wheel 23 is fixed to the drive shaft 22 via, for example, a key member. The outer periphery of the worm wheel 23 is provided with teeth having a predetermined reduction ratio to mate with the tooth grooves of the worm 21. At least one receiving slot 231 is provided on the end face of the worm wheel 23 opposite to the limiting disc 221. Preferably, a pair of receiving slots 231 is formed diametrically opposite each other on the inner periphery of the worm wheel 23. Of course, the number of the receiving slots 231 is dependent on the number of the through holes 222. In the drawings, a pair of receiving slots 231 that correspond to the pair of through holes 222 is shown, and the center of each receiving slot 231 coincides with the center of each through hole 222. Moreover, a restricting slot 232 is included in each receiving slot 231.

The driven wheel 24 is rotatably mounted on the drive shaft 22, and is not axially moveable. The driven wheel 24 is located between the limiting disc 221 and the worm wheel 23. The driven wheel 24 has an inner diameter, and has teeth that correspond to the gear teeth of the worm wheel 23 on the outer circumference. The driven wheel 24 is in mesh with and driven by the worm wheel 21. A plurality of baffle plates 241 are equally spaced on the inner circumference of the driven wheel 24 and extend radially outwardly towards the limiting disc 221.

Figure 6:
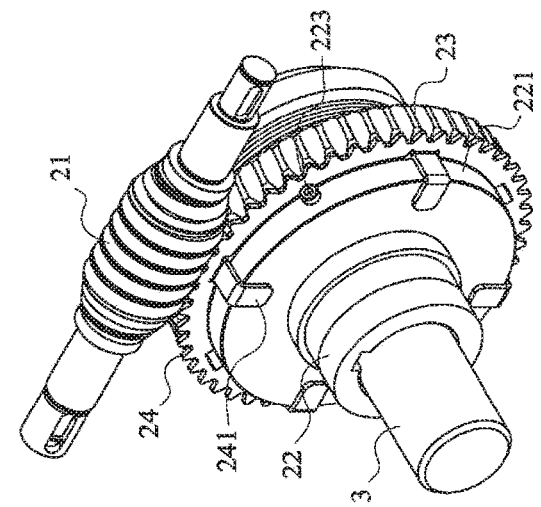
FIG. 6 is a perspective schematic view illustrating the structural and cooperation relationship between the worm, the worm wheel and the driven wheel, in which some of the components are omitted.
Figure 3:
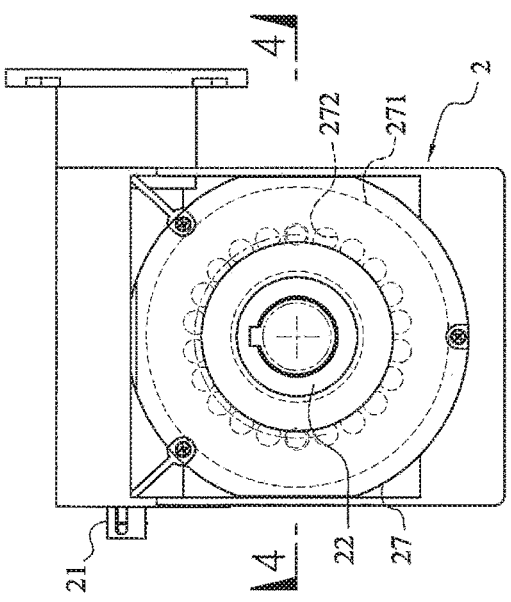
FIG. 3 is a front elevational view showing the door curtain anti-dropping device of FIG. 2.
Figure 5:
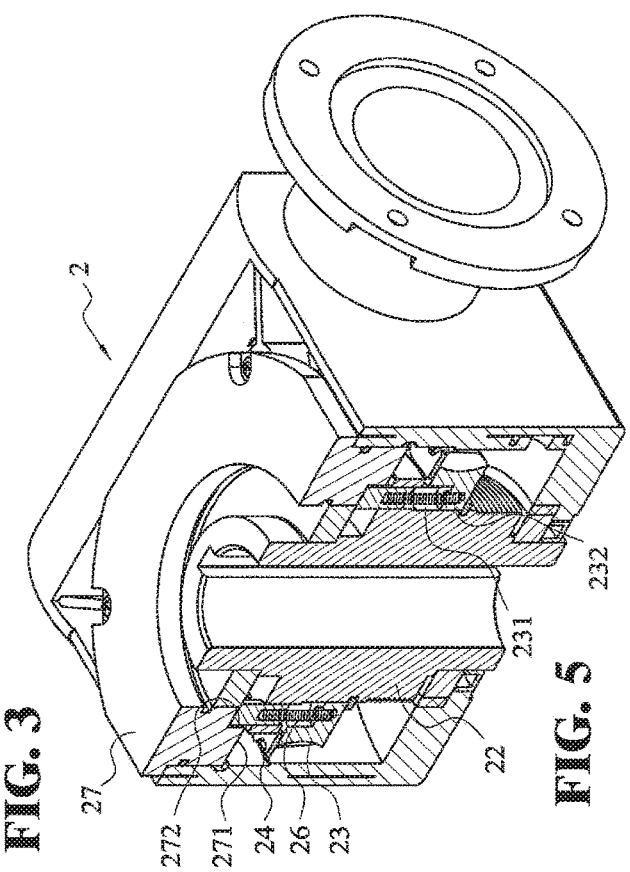
FIG. 5 is a perspective sectional view showing the door curtain anti-dropping device of the present invention, in which some of the components are omitted.

In the embodiment as shown in FIG. 6, the driven wheel 24 is driven by the worm 21 to be in synchronization with the worm wheel 23. Four equally spaced baffle plates 241 are disposed in pairs that diametrically opposite one another on the driven wheel 24. Each baffle plate 241 is in the shape of letter "L", so as to be able to clamp firmly on the limiting disc 221. Furthermore, a pair out of the two pairs of the baffle plates 241 is configured to have their free ends covering respective through holes 222 of the limiting disc 221. In addition, the present embodiment further includes four locating screws 223 that are fixed to the outer periphery of the limiting disc 221 in equally spaced fashion, so as to restrict the movable strokes of the baffle plates 241, and in turn restrict the range of rotation of the driven wheel 24.

In this embodiment, a pair of latching pins 25 that correspond to the pair of through holes 222 of the limiting disc 221 are provided. A notch 251 is defined at one end of the latching pin 25, and is received in the receiving slot 231 of the worm wheel 23. According to the present embodiment, a pair of elastic members 26 are further included. The elastic member 26 is, for example, a coil spring that may accumulate potential energy when compressed. One end of the elastic member 26 passes through the receiving slot 231 of the restricting slot 232, and is embedded therein. The other end of the elastic member 26 passes through the notch 251 of the latching pin 25 and is embedded therein. The latching pin 25 is compressed by the baffle plate 241 at one end and confined in the corresponding through hole 222, so that elastic potential energy is accumulated for the latching pin 23 (as shown in FIGS. 6 and 7).

The front cover 27 is fixedly connected to the gear box 2. The front cover 27 includes an end plate 271 with a predetermined inner diameter and is enclosed on the outer side of the limiting disc 221, and a plurality of notches 272 are equally spaced on the inner circumference of the end plate 271. The notches 272 are dimensioned to match through holes 222 of the limiting disc 221.

According to the present invention, the hardness of the driven wheel 24 is greater than the hardness of the worm wheel 23. That is, the abrasion performance of the driven wheel 24 is set to be higher than the worm wheel 23. Therefore, the worm wheel 23 and the driven wheel 24 are subject to different degrees of wear by the action of the worm 21. When the door operator drives the winding shaft under a normal condition, the driven wheel 24 and the worm wheel 23 are driven synchronously by the lead angle of the worm 21, and the latching pin 25 is compressed at one end by the baffle plate 25 and confined in the corresponding through hole 222 and receiving slot 231. As a result, elastic potential energy is accumulated for the latching pin 23 (as shown in FIGS. 6 and 7).

Referring to FIGS. 6a-6c, 7 and 7a, as the wear of the gear pairing worm/worm wheel increases with the working time and the frequency of use, the mating between the worm 21 and the worm wheel 23 gradually deteriorates. In the event of breakage of gear teeth due to overworn, the worm 21 may not be able to drive the worm wheel 23, and a retardation may occur. At the same time, as the driven wheel 24 is driven persistently by the worm 21, the driven wheel tends to pass over, resulting in a misalignment of the tooth slots of the worm wheel and driven wheel. Then the baffle plates 241 will be displaced to allow the latching pins 25 to spring out and insert in the corresponding notches 272, thereby locking the worm wheel 23. The winding shaft can no longer operate and the door curtain will not drop.

In addition, when the winding shaft is locked, the circuit current of the door operator will go overload to deactivate the overload switch, and thus safety can be further secured.

While the preferred embodiments have been described as above, it is to be noted that the preferred embodiments are not intended to restrict the scope of implementation of the present invention. Modifications and variations to the embodiments can be made without departing from the spirit and scope of the claims of this application.

What is claimed is:

1. A door curtain anti-dropping device for a rolling door comprising:

a gear box having a force input end connected to an output end of a door operator, and a force output end coupled to a door curtain;

a worm disposed in a first direction of the gear box, the worm having one end pivotally mounted on the gear box, and the other end coupled to an output shaft of the output end of the door operator;

a drive shaft disposed in a second direction of the gear box, the drive shaft having one end pivotally mounted on the gear box, and the other end driving a winding shaft of the door curtain;

a limiting disc is provided on the drive shaft and has at least one through hole on a radial end face thereof;

a worm wheel with a plurality of gear teeth fixedly mounted on the drive shaft to engage the worm, at least one receiving slot that corresponds with the at least one through hole is provided on an end face of the worm wheel that faces the limiting disc;

a driven wheel rotatably mounted on the drive shaft and arranged not to move axially, and is located between the worm wheel and the limiting disc, the driven wheel has teeth, the worm wheel and the driven wheel being in mesh with the worm so as to be driven by the worm synchronously, at least one baffle plate that is capable of covering the at least one through hole extends outwardly from the driven wheel towards the other end face of the limiting disc;

at least one latching pin having one end stored with spring potential energy and received in the at least one receiving slot, and the other end compressed and retained in the at least one through hole by the at least one baffle plate; and a front cover fixed to the gear box, the front cover comprises an end plate having a predetermined diameter and arranged opposite the limiting disc; the end plate includes a plurality of notches that correspond with the at least one through hole along an inner circumference thereof;

wherein when the gear teeth of the worm wheel are excessively worn and dislocated from the teeth of the driven wheel, the at least one baffle plate moves to allow the at least one latching pin to spring out and insert into at least one of the plurality of notches to lock the worm wheel, thereby prevent the winding shaft of the rolling curtain from rotating.

2. The door curtain anti-dropping device as claimed in claim 1, wherein the hardness of the driven wheel is greater than the hardness of the worm wheel.

3. The door curtain anti-dropping device as claimed in claim 1, wherein a pair of through holes are provided diametrically opposite each other on the limiting disc.

4. The door curtain anti-dropping device as claimed in claim 3, wherein a pair of receiving slots corresponding to the pair of through holes are disposed diametrically opposite each other on the inner circumference of the worm wheel, and each receiving slot includes a restricting slot.

5. The door curtain anti-dropping device as claimed in claim 4, wherein a pair of latching pins is accommodated in the corresponding receiving slots, and a notch is formed on an end face of each latching pin.

6. The door curtain anti-dropping device as claimed in claim 5, further comprising a pair of elastic elements that store the spring potential energy by compression, each of the elastic elements has one end correspondingly received in the restricting slot of each receiving slot, and the other end correspondingly inserted in the notch of the latching pin.

7. The door curtain anti-dropping device as claimed in claim 6, wherein two pairs of baffle plates are disposed diametrically opposite each other on the driven wheel, and the pairs of baffle plates each is formed in the shape of letter "L", so as to be able to clamp firmly on the limiting disc, and at least a pair of the baffle plates are configured to have their free ends covering respective through holes of the limiting disc.

8. The door curtain anti-dropping device as claimed in claim 3, wherein a plurality of notches are equally spaced on the inner circumference of the end plate, and the notches are dimensioned to match the through holes of the limiting disc.

* * * * *